Apr. 17, 1923.
A. B. RYPINSKI
1,451,894
ELECTRIC RIVETING MACHINE AND PROCESS
Filed Jan. 26, 1921  5 Sheets-Sheet 1
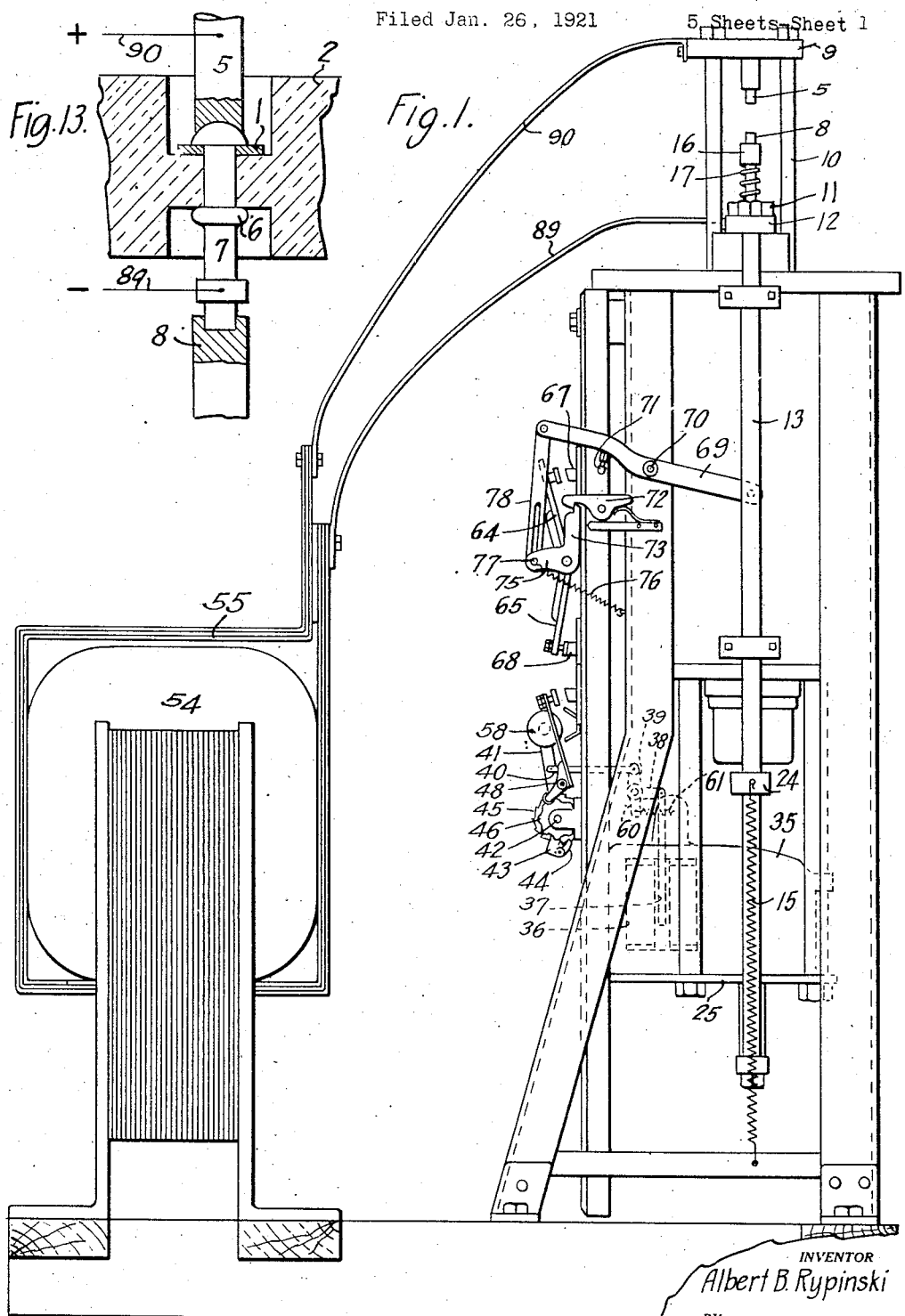
INVENTOR
Albert B. Rypinski
BY
N. Anthony Usina, ATTORNEY

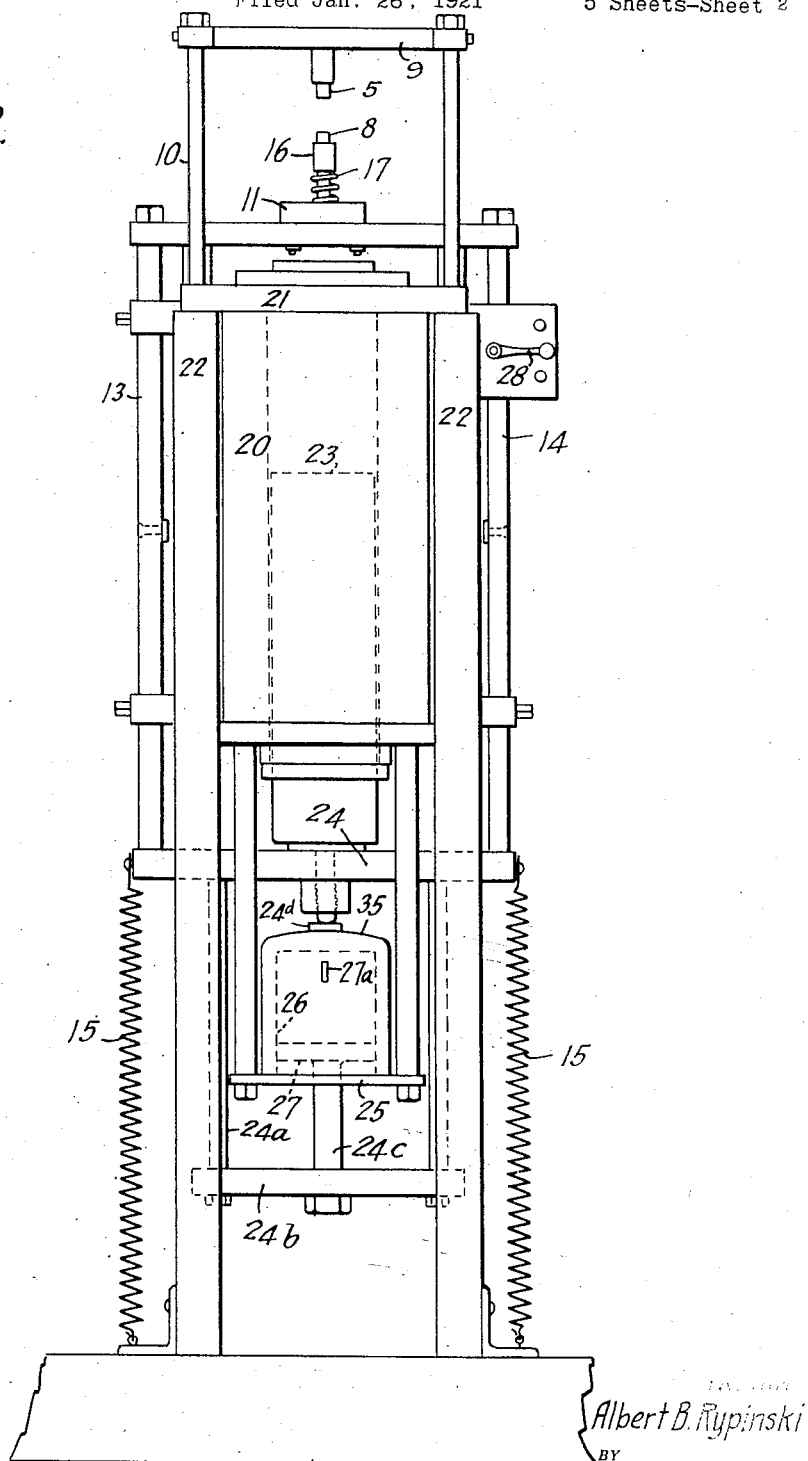

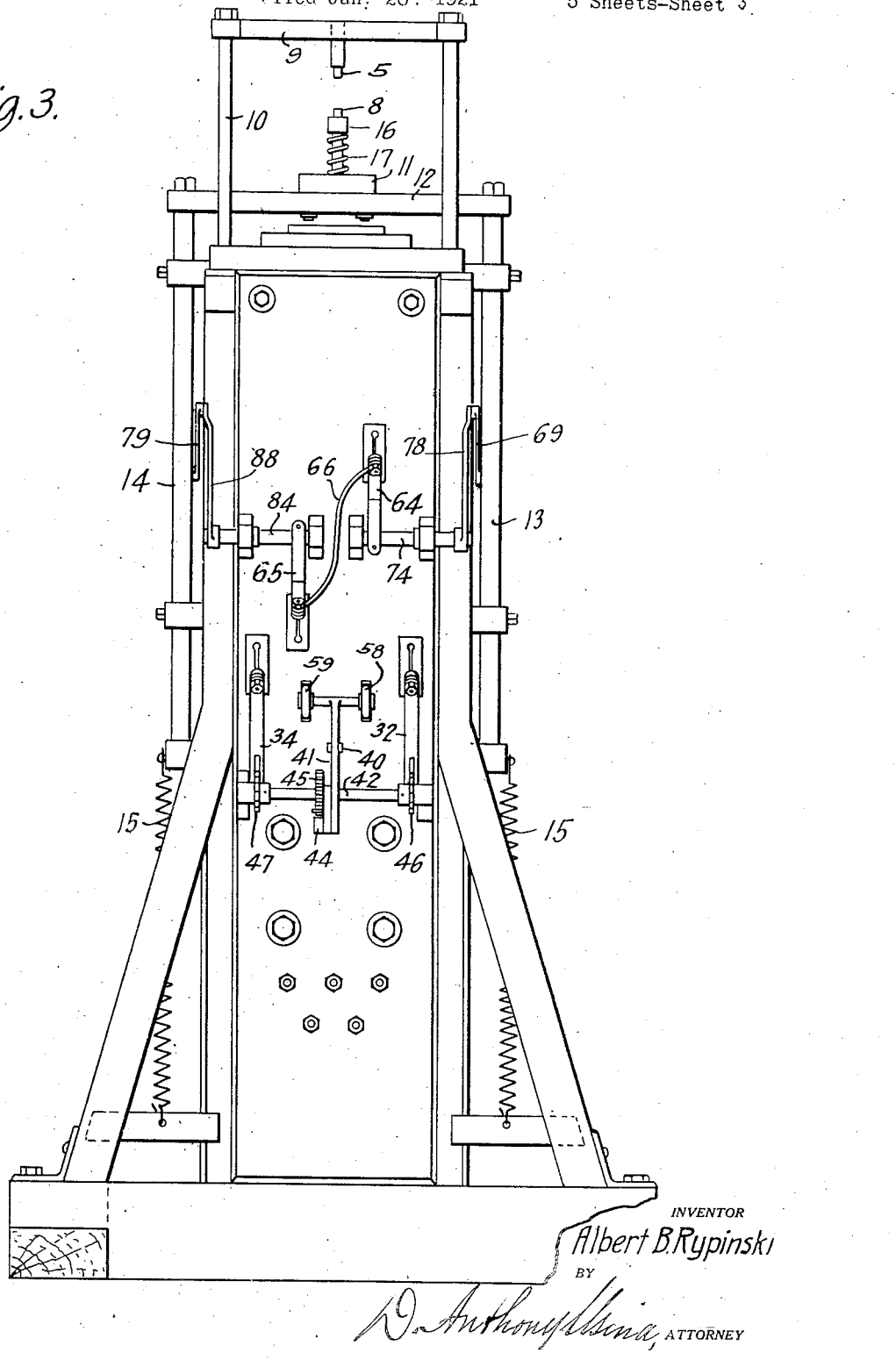

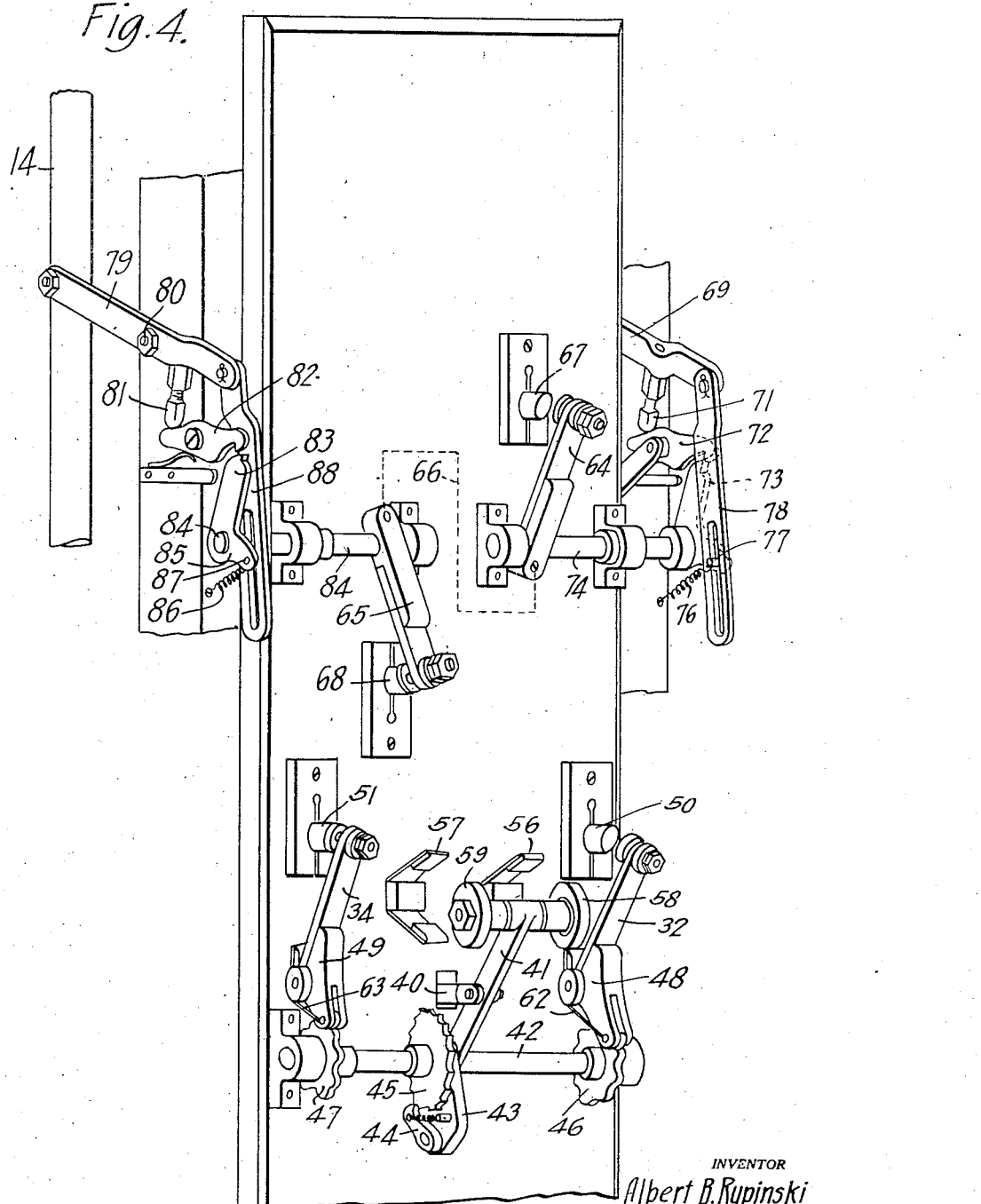

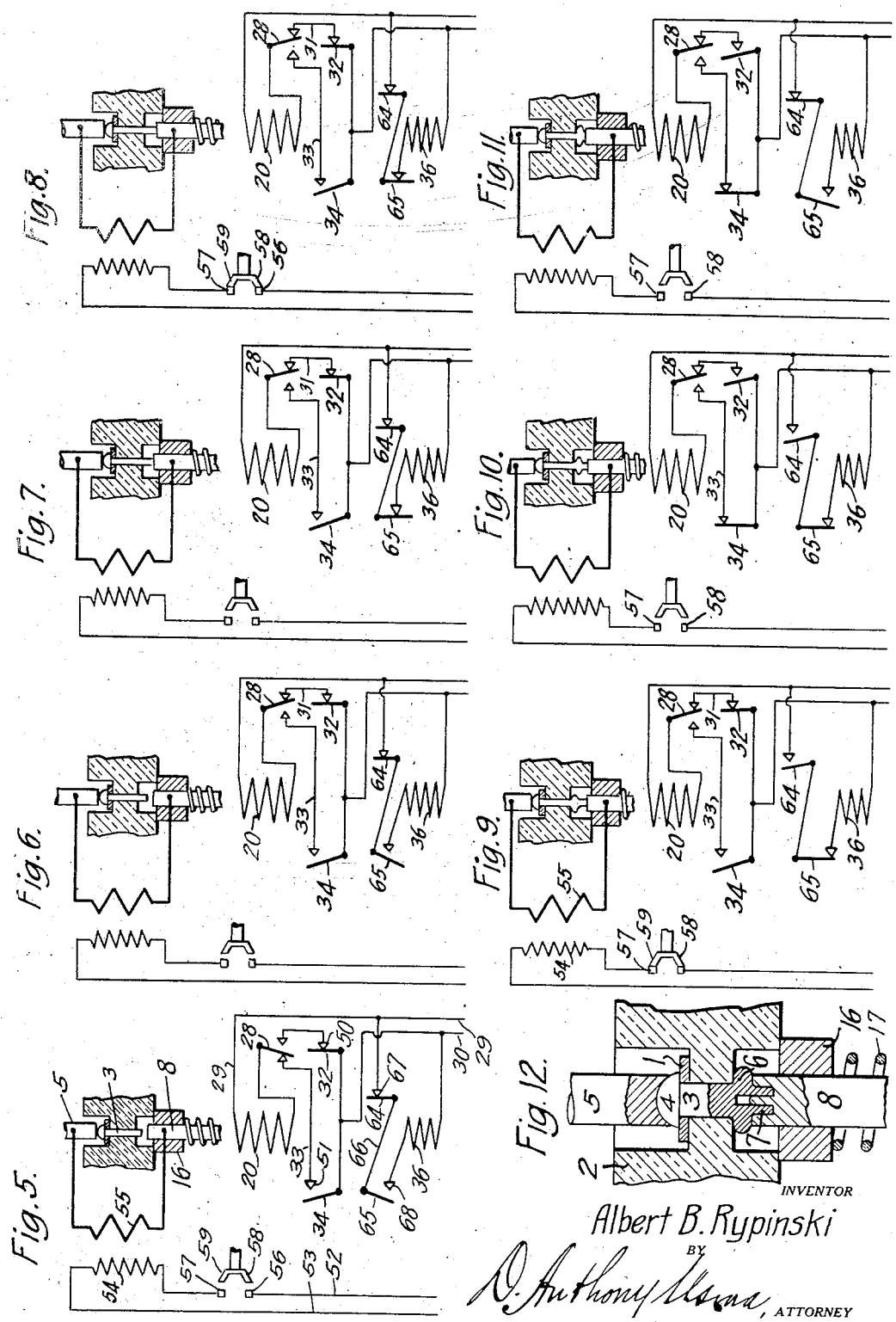

Patented Apr. 17, 1923.

1,451,894

UNITED STATES PATENT OFFICE.

ALBERT B. RYPINSKI, OF LAURELTON, NEW YORK, ASSIGNOR TO THOMAS E. MURRAY, OF LONG ISLAND, NEW YORK.

ELECTRIC RIVETING MACHINE AND PROCESS.

Application filed January 26, 1921. Serial No. 439,920.

*To all whom it may concern:*

Be it known that I, ALBERT B. RYPINSKI, a citizen of the United States, and resident of Laurelton, Long Island, New York, have invented certain new and useful Improvements in Electric Riveting Machines and Processes, of which the following is a specification.

In my Patent No. 1,329,144 of January 27, 1920, I have described a method of electric riveting. The present application is based on a machine designed particularly for riveting according to the method of said patent, and adapted also for various other methods of electric riveting.

The accompanying drawings illustrate an embodiment of the invention.

Figs. 1 and 2 are respectively a side and a front elevation of the machine;

Fig. 3 is a rear elevation, omitting the transformer and electrical connections thereof;

Fig. 4 is a perspective view of the rear face of the machine showing the relations between the several switches;

Figs. 5 to 11 inclusive are diagrammatic views illustrating the successive stages in the operation of the machine;

Fig. 12 is an enlarged detail of the electrodes in engagement with the finished work;

Fig. 13 is a view similar to Fig. 12 illustrating a modification.

Referring first to Fig. 12 I have illustrated the riveting of a strip 1 of metal to a plate 2 of porcelain or the like. The rivet 3 has its head 4 pressed down by an electrode 5 on to the strip 1, its shank passing through openings in the strip and the porcelain plate and having a head or shoulder 6 upset against the underside of the porcelain plate, beyond which head is a projection 7 which may be used for an electrical contact. The end of the rivet is hollow and is upset by means of a movable electrode 8 shaped to embrace the end of the rivet and to give it the desired form.

Referring to Figs. 1, 2 and 3 the upper electrode 5 is fixed on the underside of a cross-head 9 mounted on posts 10 on the top of the machine and the lower electrode 8 is mounted on a block 11 carried on a movable cross-head 12 which is mounted on rods 13, 14 sliding in guides fixed on the opposite sides of the machine and pulled down by means of springs 15 attached to the lower ends of the rods and to the lower part of the frame of the machine. In operation the work is introduced between the two electrodes and held up with the electrode 5 bearing on the head of the rivet. The lower electrode 8 is then pressed up into contact with the end of the rivet and, as the latter is softened by the passage of the current through it, moves up and upsets the rivet as desired.

For holding the parts in position before riveting, a holder is used comprising a ring 16 of fibre or similar packing material surrounding the lower electrode and pressed upward by a spring 17 bearing at its lower end on the block 11. This will hold the parts in the position shown in Fig. 5, the ring 16 engaging the plate 2 immediately around the rivet while permitting the electrode 8 to pass up into the recess 18 in the underside of the plate and the electrode 5 bearing on the head 4 of the rivet. The operator then has only to throw the hand switch which controls the machine, whereupon the latter will automatically perform in correct sequence the necessary operations, pressing the lower electrode against the end of the rivet, closing the circuit through the electrodes and the rivet so as to soften the latter and cause it to be upset by the upward pressure of the lower electrode, and breaking the circuit through the rivet and stopping the movement of the lower electrode and finally withdrawing the latter. Various means may be utilized for securing these or other desired operations.

The pressure device for the lower electrode which I propose to use is a solenoid 20 mounted on the underside of the head 21 of the machine and fixed between the side frames 22 thereof, having a core 23 the lower end of which is fastened to a cross-bar 24 the ends of which are fastened to the lower ends of the slide rods 13, 14 so that when the solenoid is energized its core is pulled up with a considerable pressure and presses the lower electrode up correspondingly. Mounted on a fixed cross-bar 25 of the machine is a casing carrying a dash-pot 26 with a piston 27 working in the dash-pot provided with a relief valve 27ᵃ for limiting its rate of speed on the upward movement, while permitting it to move downward freely. The cross-bar 24 is connected by depending rods 24ᵃ to a cross-bar 24ᵇ carrying a rod 24ᶜ at the upper end of which is mounted a piston 27. The lower end of the core 23 is arranged to rest on a lug 24ᵈ on the top of the casing 35 hereinafter referred to, in the lowered position of the electrode. When the machine is out of use the springs 15 pull the electrode and the solenoid core 23 down until the latter engages the stop 24ᵈ. As the electrode is pressed up its movement is retarded by the dash-pot whose piston is connected to the electrode through the downwardly extending rod 24ᶜ and connections described.

Mounted on the side of the machine is a hand switch 28 of the type shown in Fig. 2. The current for controlling the several operations of the machine may be alternating or direct. It comes in through wire 29 (Fig. 5) to the pressure solenoid 20 and out by way of the hand switch 28 through either of two paths to the wire 30. When the switch 28 is thrown to the right, as from the position of Fig. 5 to that of Fig. 6, the current passes through a wire 31 and an automatic switch 32. When the hand switch is thrown to the left the current has to pass through a wire 33 and an automatic switch 34. In alternate operations of the machine the hand switch is thrown to the right or to the left. Assuming it thrown to the right as shown (Fig. 6), the circuit is completed through the pressure solenoid and the other operations take place in proper sequence and finally the switch 32 is opened (Fig. 11) interrupting the operation and the switch 34 is closed setting the machine in position for the next operation which will require a throwing of the hand switch to the left.

The switches 32 and 34 are indicated in the rear elevation of the machine (Fig. 3) and in perspective in Fig. 4. The casing 35, Figs. 1 and 2, contains at its forward end the dash-pot 26 as previously explained and in its rear end a control solenoid 36, shown in dotted lines in Fig. 1, the core 37 of which extends upward and engages the horizontal arm 38 of a bell crank lever whose vertical arm 39 is connected to a link 40 extending through the rear wall of the machine and connected to an upwardly extending arm 41 carrying at its upper end certain contacts, hereinafter referred to, and having at its lower end a hub turning on a shaft 42, Fig. 4. The hub of the arm 41 carries a plate 43 with a spring pawl 44 engaging a ratchet wheel 45 on the shaft 42 so that at each operation of the solenoid the shaft 42 is turned one step.

The shaft 42 carries cam wheels 46 and 47 at its opposite ends. The cam wheel 46 works on a roller on the arm 48 which is fast to the switch arm 32, and the cam 47 works on a similar arm 49, of the switch arm 34. Contacts 50 and 51 are connected in the circuit, as shown in Fig. 5, and face the switch blades 32 and 34 respectively. The cams 46 and 47 are set at an angle to each other so that for each movement of the cam shaft 42 one of the switches 32, 34 is closed and the other is opened, their operation alternating with each operation of the machine.

Besides operating the switches 32 and 34 which close the circuit through the pressure solenoid 20 and cause the lower electrode to press up against the rivet, the control solenoid 36 closes the welding circuit through the electrodes and the rivet. This circuit is indicated in Fig. 5 with wires 52 and 53 leading from an alternating current supply to the primary coil 54 of a transformer whose secondary coil 55 is connected at its opposite terminals to the electrodes 5 and 8; so that when the primary circuit is closed a current of low voltage and large amperage flows through the rivet and softens it quickly. In the wire 52 is a break with terminals 56 and 57 facing a switch member with contacts 58 and 59, shown on Fig. 4 as rollers carried on the upper end of the arm 41 adapted to be pressed between the plates 56 and 57 respectively, when the arm 41 is pulled inward by the control solenoid. Referring to Fig. 1, the bell crank lever which is directly actuated by the solenoid has a depending arm 60 which is pulled inward by a spring 61 when the current is off the solenoid and which thus throws out the arm 41 to open the welding current circuit. Also the arms 32 and 34 are pressed open by means of flat springs 62 and 63 respectively when a depression of the operating cam comes into play. Thus it will be seen that the controlling magnet 36 opens and closes the switches of the pressure magnet 20 which moves the electrode and of the welding circuit. The opening and closing of the circuit through the controlling magnet is effected by the following mechanism.

The control magnet 36 is connected at one end to the wire 30 and at its opposite end to the wire 29 of the controlling current through a pair of switches comprising arms 64 and 65 connected by a wire 66 and registering with contacts 67 and 68 respectively.

The mechanism for actuating the switches 64 and 65 is illustrated in Figs. 1, 3 and 4. The side rods 13 and 14 are shown in the downward position, before the commencement of a riveting operation. As the rod 13 (Fig. 1) moves upward it carries with it the forward end of a lever 69 pivoted at 70 on the frame of the machine and carrying a striker 71 which is screwed into the lever and thus capable of very nice adjustment. The striker moves downward and at an exactly determined point in the upward movement of the rod 13, and the electrode, strikes the forward end of a hook 72 which is pivoted on the side of the machine, lifting the hook and releasing an arm 73 mounted on a short shaft 74 which carries another arm 75 connected to a spring 76 which tends to pull the arm down and to turn the shaft 74 correspondingly. On its inner end, Fig. 3, the shaft 74 carries the switch arm 64 corresponding to the switch 64 of the diagrams. Therefore, when the electrode moves up to the desired limit the spring will open the switch 64. The arm 75 carries a pin 77 traveling in a slot in a link 78 depending from the rear end of the lever 69. This limits the downward movement of the arm 75 and the extent to which the switch lever is thrown out. Also when the rod 13 moves down the link is lifted and will lift the arm 75 so as to close the switch and to cause the arm 73 to be caught by the hook 72 ready for the next operation.

On the opposite side of the machine the sliding rod 14 actuates in a similar way the lever 79 pivoted at 80, and carrying an adjustable striker 81 which strikes the tail of a hook 82 so as to lift it from an arm 83 of a cross-shaft 84 carrying the alternative switch 65, this shaft 84 having an arm 85 pulled downward by a spring 86 and having a pin 87 traveling in a slot in a link 88 depending from the rear end of the lever 79.

The switch arm 64 extends upward from its shaft 74 and the switch arm 65 downward from its shaft 84. The sliding rods 13 and 14 move upward and downward together. Consequently they both release their shafts and switch arms 64 and 65 on the upward movement and at intervals which are determined by the adjustment of the strikers 71 and 81. The release of the switch 64 causes the spring to open it, and the release of the switch 65 causes the spring to close it. And on the upward movement of the electrode the restoration of the parts as in Fig. 1 closes the switch 64 and opens the switch 65.

The sequence of operations will be understood from Figs. 5 to 11. At the starting point the work is held as in Fig. 5 with the lower electrode just below the end of the rivet. The shifting of the hand switch 28 (Fig. 6) closes a circuit through the main or pressure solenoid 20 and causes the lower electrode to move up slightly. The striker 81, Fig. 4, is so adjusted that this initial movement releases the switch 65, which is closed by the spring, bringing the parts to the position of Fig. 7, and causing current to flow through the control magnet 36.

The first function of the control magnet is to move the switch arm carrying the contacts 58 and 59, closing the welding circuit and causing a flow of current through the rivet. See Fig. 8. This movement of the switch arm 41 of the welding circuit about the shaft 42, Fig. 4, merely retracts the pawl 44. That is, it has no effect on the shaft 42.

The flow of current through the rivet softens it and allows the lower electrode to move up still farther under the continuing pressure of the main solenoid 20. The striker 71 is so adjusted that on this continual upward movement it will at the proper point release the shaft 74 and allow the switch arm 64 to swing outward, as in Fig. 9, thus breaking the circuit through the control magnet 36. The effect of this is (Fig. 10) to break the circuit of the welding current and to stop further upward movement of the electrode by the cooling of the rivet. Also (Fig. 4) the pawl turns its ratchet and the shaft 42 one step, which will shift the two switch arms 32 and 34 closing the one (34) which was open and opening the one (32) which was closed, so as to put the circuits in position for the next operation, as in Fig. 10.

As soon as the current in the pressure solenoid 20 is cut off, the electrode is drawn downward by its springs and the rods 13 and 14 restore the switches 64 and 65 to their initial positions as shown in Fig. 11. Thus the parts are all in the same position as in Fig. 1 except that the switches 32 and 34 are reversed and the hand switch 28 is on the open line ready at the next operation to close the circuit in the main magnet 20 and start a new sequence of operations.

It is important to use an alternating current for the welding circuit in order to develop a large quantity of current at a low voltage, which is best for this work, but for the controlling circuits a direct current supply may be used, with comparative economy.

Various motors or drivers may be used instead of the solenoids 20 and 36 for actuating the electrode and controlling the welding current.

The invention may be applied to various other types of machine, horizontal or vertical, and arranged to move either or both of the electrodes. The invention may also be applied, as to some of its features, to riveting machines which do not soften the rivet by passing current through it, and the parts 5 and 8, or either of them, though shown as electrodes, may be used merely as pressers or upsetting tools, other means being used as the conductors of a heating current to the rivet.

Also the method described may be utilized by various other mechanisms. The limiting of the upsetting operation by the resistance of the rivet as it cools, is a method which, quite independent of the mechanism for carrying it out, is of great utility, and particularly for the riveting of articles of porcelain and similar irregular brittle material, where it is difficult to secure an even bearing of the upset metal on the plate.

According to the present invention the upsetting electrode or other tool moves easily through a certain distance while the rivet is softened by the passage of the current, and the pressure on the electrode is continued after the softening current is cut off, so that the electrode moves through a further distance which is determined by the thickness of the plate and by the gradual hardening of the rivet. Thus the upset metal of the rivet is brought to engage with practically its entire area against the face of the plate regardless of the irregularities of the latter. The continuance of the pressure after the softening current is cut off is advantageous also in that it holds the rivet in finished shape as it cools, and thus overcomes the tendency of the rivet to pull itself in two by contraction, a tendency particularly noticeable with tubular rivets where the pressure is relieved too quickly after the heating current is cut off.

Similarly the comparatively small holding ring 16 is provided in order to engage the porcelain immediately around the rivet notwithstanding any accidental or intentional irregularities which may be located on this face of the plate. The ring 16 being pressed up forcibly against the porcelain is preferably made of yielding material so as to fit against the irregularities of the porcelain and to avoid injury thereto.

Fig. 13 illustrates more or less diagrammatically the use of the part 8 as a mere presser or upsetting tool without carrying the current through it. The extension 7 of the rivet beyond the upset portion 6 is sufficiently long to clamp on to one of the two electric connections 89 and 90 which are connected to the secondary terminals of the transformer. Various other arrangements may be provided in which the parts 5 and 8 serve only to press against the opposite ends of the rivet and in which the current is applied through other means.

Though I have described with great particularity an apparatus embodying my invention, yet it will be understood that the invention is not restricted to the particular embodiment disclosed. Various modifications thereof in detail and in the arrangement of the parts may be made without departing from the invention as defined in the following claims.

What I claim is:

1. An electric riveting apparatus including in combination means for supporting the parts to be riveted in assembled position from below with the rivet extending below said parts and with one electrode engaging the upper end of the rivet and holding the same down and making a direct electric connection therewith, and with the other electrode out of engagement with the rivet and adapted to be moved up against it to complete the circuit through it and to upset it.

2. An electric riveting apparatus including in combination a pair of electrodes one above the other adapted to make a direct electric connection with the ends of the rivet and a holder adjacent to the lower one of them and adapted to press the head of the rivet in assembled position against the upper one, said lower electrode being movable with respect to said holder.

3. An electric riveting apparatus including in combination a pair of electrodes, means for pressing them into engagement with the rivet and toward each other and means controlled by the movement of one of said electrodes for thereafter closing the circuit through the rivet to soften the latter and further moving one of the electrodes toward the other to upset the rivet.

4. An electric riveting apparatus including in combination a pair of electrodes, means for pressing them into engagement with the rivet and toward each other and means for closing the circuit through the rivet to soften the latter further moving one of the electrodes toward the other to upset the rivet, and means controlled by the movement of the electrode for breaking the circuit through the rivet.

5. An electric riveting apparatus including in combination a pair of electrodes, means for pressing them into engagement with the rivet and toward each other and means for closing the circuit through the rivet to soften the latter and further moving one of the electrodes toward the other to upset the rivet and means controlled by the movement of the electrode for breaking the circuit through the rivet and for stopping the pressure on the electrode.

6. An electric riveting apparatus including in combination a pair of electrodes, means for closing the circuit through the rivet and upsetting the latter and means controlled by the upsetting movement for breaking the circuit through the rivet.

7. An electric riveting apparatus including in combination means for pressing an electrode forward and means for limiting the rate of speed on the forward movement of the electrode.

8. An electric riveting apparatus including in combination electrodes and means controlled by the advance of an electrode for closing a circuit through the rivet at a remote point in such circuit.

9. An electric riveting apparatus including in combination electrodes and means controlled by the advance of an electrode for closing and opening a circuit through the rivet at the beginning and end of the riveting operation.

10. An electric riveting apparatus including in combination an electric motor controlling the circuit through the rivet and means controlled by the movement of an electrode for controlling the circuit through said motor.

11. A riveting apparatus including in combination a motor for operating an upsetting tool, a hand operated device for starting said motor and a second motor controlled by the movement of said upsetting tool for stopping the first motor.

12. An electric riveting apparatus including in combination an electric motor for operating an electrode, a hand switch for starting said motor and a second electric motor controlled by the movement of the electrode for making and breaking a circuit through the rivet and for breaking the circuit through the first motor.

13. An electric riveting apparatus including in combination an electric motor for operating an electrode, a hand switch for starting said motor, two circuits adapted to be connected alternately to said motor by said hand switch, a supplementary switch in each of said circuits and means automatically controlled on each alternate operation of the machine for opening the supplementary switch in the circuit which is connected to the motor at the time and closing the other supplementary switch so as to put the circuits in condition for the next operation.

14. An electric riveting apparatus including in combination a motor for operating an electrode, a controlling motor and means actuated successively thereby for establishing a circuit through the rivet and for breaking the circuit through the operating motor.

15. An electric riveting apparatus including in combination a motor for operating an electrode, a controlling motor and means actuated successively thereby for establishing a circuit through the rivet and for breaking the circuit through the operating motor, the timing of said successive operations being controlled by the advance of the electrode.

16. An electric riveting apparatus including in combination an upsetting tool, mechanism for pressing the upsetting tool against the rivet and withdrawing it, mechanism for applying the heating current to the rivet and cutting off such current and a hand switch which at a single operation sets said mechanisms in operation to first press the upsetting tool forward, then apply the heating current, then cut off such current and finally withdraw the upsetting tool.

17. An electric riveting machine including in combination means for holding the work in position, mechanism for pressing and withdrawing an upsetting tool and mechanism for applying and withdrawing the heating current to and from the rivet and a hand switch which at a single operation sets said means and mechanisms in operation to first hold the work in position, then press the upsetting tool against the rivet, then apply the heating current, then cut off such current and withdraw the upsetting tool and finally release the work.

18. An electric riveting apparatus including means for pressing an upsetting tool against the rivet, means for closing the circuit through the rivet to soften the same and means for breaking said circuit and continuing the pressure of the upsetting tool to cause it to move through a distance depending on the resistance offered.

19. The method of electric riveting which consists in softening the rivet electrically and pressing an upsetting tool against it to upset it to a predetermined extent and then cutting off the current and maintaining the pressure on the tool to produce a further movement controlled by the resistance of the work.

In witness whereof, I have hereunto signed my name.

ALBERT B. RYPINSKI.